(12) United States Patent
Ekeberg et al.

(10) Patent No.: US 12,434,028 B2
(45) Date of Patent: Oct. 7, 2025

(54) APPARATUS FOR HUMIDIFYING AIR ENTERING INTO A TRACHEOSTOMY VALVE

(71) Applicant: FOGLESS INTERNATIONAL AB, Jönköping (SE)

(72) Inventors: Daniel Ekeberg, Jönköping (SE); Inge Blomquist, Vaggeryd (SE)

(73) Assignee: FOGLESS INTERNATIONAL AB, Jönköping (SE)

( * ) Notice: Subject to any disclaimer, the term of this patent is extended or adjusted under 35 U.S.C. 154(b) by 621 days.

(21) Appl. No.: 17/908,558

(22) PCT Filed: Mar. 2, 2021

(86) PCT No.: PCT/SE2021/050176
§ 371 (c)(1),
(2) Date: Sep. 1, 2022

(87) PCT Pub. No.: WO2021/177881
PCT Pub. Date: Sep. 10, 2021

(65) Prior Publication Data
US 2023/0158263 A1 May 25, 2023

(30) Foreign Application Priority Data
Mar. 2, 2020 (SE) .................................. 2050231-6

(51) Int. Cl.
*A61M 16/04* (2006.01)
*A61M 16/10* (2006.01)
(52) U.S. Cl.
CPC ..... *A61M 16/0468* (2013.01); *A61M 16/1045* (2013.01)

(58) Field of Classification Search
CPC .............. A61M 16/04; A61M 16/0465; A61M 16/0468; A61M 16/047; A61M 16/1045; A61M 16/16; A61M 16/20; A61F 2/203
See application file for complete search history.

(56) References Cited

U.S. PATENT DOCUMENTS 2,491,647 A * 12/1949 Colavita ............. A61M 16/047
128/207.14
3,881,482 A 5/1975 Lindholm
(Continued)

FOREIGN PATENT DOCUMENTS

CN 102227231 A 10/2011
CN 107106802 A 8/2017
(Continued)

OTHER PUBLICATIONS

Patent Cooperation Treaty (PCT), International Search Report and Written Opinion for Application PCT/SE2021/050176 filed Mar. 2, 2021, mailed May 27, 2021, International Searching Authority, EP.
(Continued)

*Primary Examiner* — Joseph D. Boecker
(74) *Attorney, Agent, or Firm* — McDonald Hopkins LLC

(57) ABSTRACT

The disclosure relates to a hood for humidifying air entering into a tracheostomy valve comprising: a container having a front wall and a rear wall, the rear wall being configured to face an inlet of the tracheostomy valve; the container comprising a material enclosed by the front wall and the rear wall; and a channel, extending through the front wall, extending pass the material and extending through the rear wall, allowing exterior air to flow through the container to the tracheostomy valve during inhalation.

17 Claims, 8 Drawing Sheets

(56) References Cited

U.S. PATENT DOCUMENTS

| | | | |
|---|---|---|---|
| 4,325,366 A * | 4/1982 | Tabor | A61M 16/0468 128/207.16 |
| 4,763,645 A | 8/1988 | Kapp | |
| 5,022,394 A | 6/1991 | Chmielinski | |
| 5,042,468 A | 8/1991 | Lambert | |
| 6,733,556 B1 | 5/2004 | Luigi | |
| RE47,129 E | 11/2018 | Shikani et al. | |
| 2002/0157667 A1 * | 10/2002 | Fini | A61M 16/1045 128/207.14 |
| 2005/0178390 A1 | 8/2005 | Worthington | |
| 2007/0251523 A1 * | 11/2007 | Landuyt | A61M 16/047 128/203.12 |
| 2008/0099013 A1 * | 5/2008 | Graham | A61M 16/047 128/202.13 |
| 2009/0301479 A1 * | 12/2009 | Pedarzini | A61M 16/1045 128/201.13 |
| 2012/0152239 A1 * | 6/2012 | Shikani | A61M 16/0468 128/201.13 |
| 2014/0150779 A1 * | 6/2014 | Persson | A61M 16/1055 128/201.13 |
| 2014/0352691 A1 * | 12/2014 | Shikani | A61M 16/0816 128/205.24 |
| 2016/0206846 A1 * | 7/2016 | Blom | A61M 16/1045 |
| 2016/0250438 A1 | 9/2016 | Harwood et al. | |
| 2022/0080142 A1 * | 3/2022 | Shikani | A61M 16/047 |

FOREIGN PATENT DOCUMENTS

| | | | | |
|---|---|---|---|---|
| DE | 202004008889 | | 9/2001 | |
| DE | 202004011290 | | 9/2004 | |
| DE | 202008002152 U1 | | 5/2008 | |
| DE | 202012011324 | | 1/2013 | |
| GB | 2391816 A | * | 2/2004 | A61M 16/1045 |
| SE | 9000135 | | 1/1990 | |
| WO | 1991005579 | | 5/1991 | |
| WO | 2013152755 A1 | | 10/2013 | |

OTHER PUBLICATIONS

Communication under Rule 71(3) EPC dated Mar. 27, 2024; European Patent Application No. 21710636.8; 41 pages.

Office Action and Search Report dated Apr. 10, 2025; Chinese Patent Application No. 202180017997.X. 10 pages.

* cited by examiner

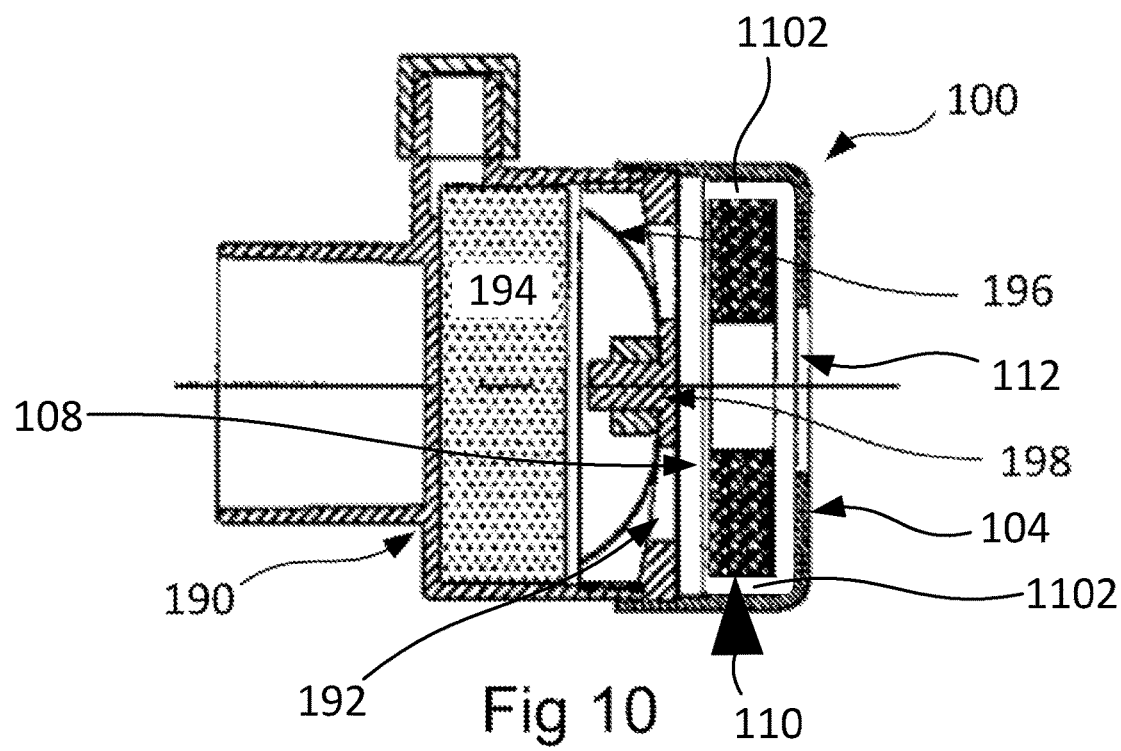
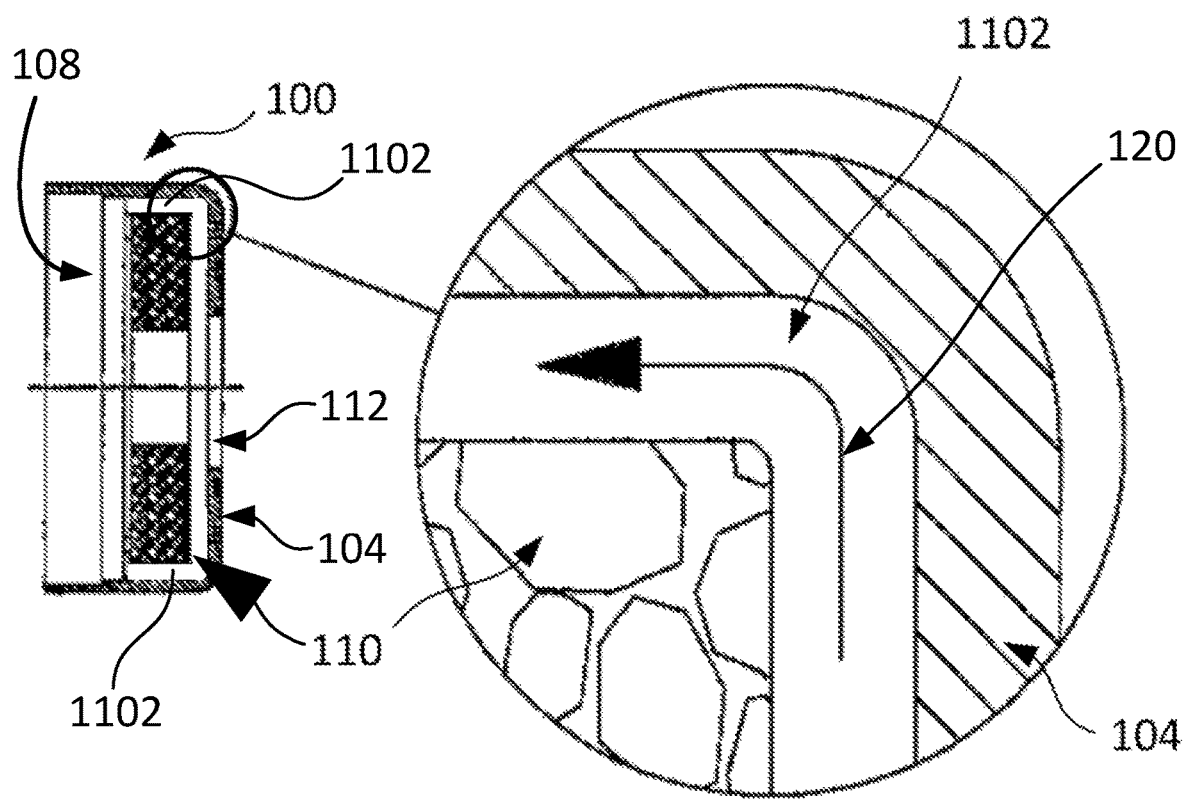

APPARATUS FOR HUMIDIFYING AIR ENTERING INTO A TRACHEOSTOMY VALVE

CROSS-REFERENCE TO RELATED APPLICATION

This application is a 35 U.S.C. § 371 national stage application of PCT Application No. PCT/SE2021/050176 filed on Mar. 2, 2021, entitled "A HOOD FOR HUMIDIFYING AIR ENTERING INTO A TRACHEOSTOMY VALVE," which claims priority to Sweden Patent Application No. 2050231-6 filed on Mar. 2, 2020.

TECHNICAL FIELD

The present disclosure relates to a tracheostomy valve comprising a detachable additive hood and/or insert and/or cap and/or lid and the detachable additive hood and/or insert and/or cap and/or lid itself for humidifying air entering into the tracheostomy valve. More specifically, the disclosure relates to a detachable additive hood for humidifying air entering into a speaking tracheostomy valve and/or a humidifying tracheostomy valve, as defined in claim 1.

BACKGROUND ART

Different types of solutions for breathing valves including membranes are known within the technical area of tracheostomy valves. Many of these valves also improve the ability to speak. Many tracheostomy valves work as humidifying valves where exhaled air can be utilized for capturing moisture prior to its release to the atmosphere, e.g. by the utilization of some kind of built in or integrated air permeable moisture-heat exchanger, which captured moisture at exhaling is released to the air at inhaling.

Examples of such valves are disclosed in WO 2009/018384 A1 and EP 2 501 424 B1 disclosing tracheostomy valves comprising valve bodies having first inner ends, second outer ends, and passageways extending between the ends through the valve bodies to allow air flow from and through the first end to the second end. Outer in this context means facing away from a patient (from a tracheostomy tube) and inner means facing the patient, i.e. the first inner end is attachable to the tracheostomy tube. Transverse flexible membranes are located within the passageways at a distance from the first end of these valves. Caps are adapted to be secured to the outer valve ends and have openings with diameters largely corresponding to the inner diameters of passageways, the openings defining rims. Each cap is provided with a hub and radial spokes extend from the hub to the rim. The hub is provided with a hole designed to mate with a post on a rib located in the passageway transversely to the direction of airflow through the passageway near the outer end. The post is located at the center of the rib on the outer rib side. This post cooperate with a central hole in the membrane to hold the membrane in place. The rib has a slightly raised portion adjoining the post. The rim is provided with a seating ring on the inner side (i.e. the side facing the patient when the cap is mounted) for supporting the periphery of the membrane. When the cap is attached, the central part of the membrane will be clamped between the hub and the raised portion on the rib. The seating ring is offset inwards relative to the inner surface of the hub.

In these exemplary valves, when the cap is attached, each flexible membrane is deformed so as to be preloaded into engagement with the seating ring intended to result in an un-interrupted positive seal between membrane and seating ring.

Further examples of solutions for breathing valves are given in U.S. Pat. No. 5,666,950 A, which discloses a filter for tracheostomy valves, and WO 2013/152755 A1, which discloses a tracheostomy valve.

A problem with the solutions of the prior art is that air inhaled through the valve is too dry and uncomfortable and undesirable, and may dry out delicate mucous membranes. As delicate mucous membranes are dried out, the user of the tracheostomy valve may find it more difficult to speak. This may also cause need of slime suction to a greater extent.

Thus, there may be a need for improved humidification of tracheostomy valves.

SUMMARY

It is an object of the present disclosure to mitigate, alleviate or eliminate one or more of the above-identified deficiencies and disadvantages in the prior art and solve at least the above-mentioned problem.

According to a first aspect there is provided an additive hood for humidifying air entering into a tracheostomy valve, the additive hood being configured to be detachably or fixedly attached at or to or against or around or over or in an inlet of the tracheostomy valve and comprises: a container having a front wall and a rear wall, the rear wall being configured to face the inlet of the tracheostomy valve; the container comprising a material enclosed by the front wall, and the rear wall; and a channel, extending through the front wall, extending pass the material and extending through the rear wall, allowing exterior air to flow through the container to the tracheostomy valve during inhalation, wherein the material is configurable or configured to humidify air flowing through the channel. Hereby, inhaled air through a tracheostomy valve becomes even more humid and/or less dry.

According to some embodiments, the container further comprises a sidewall and wherein the material is enclosed by the front wall, the sidewall and the rear wall and/or wherein the container is cylindrical. Hereby, the additive hood may be easier to manufacture.

According to some embodiments, the channel is surrounded and/or confined by the material. Hereby, the exchange of humidity from the material to the air of the channel is improved.

According to some embodiments, the front wall, the sidewall and/or the rear wall comprises a hard material, such as plastic.

According to some embodiments, the material comprises a moisture carrying material, a foamy material, a fibrous material and/or a porous material. Hereby, the exchange of humidity from the material to the air of the channel is facilitated.

According to some embodiments, the channel is located at the center of the front wall and/or at the center of the rear wall. Hereby, the additive hood may be easier to manufacture and/or the additive hood may be more efficient.

According to some embodiments, the channel is cylindrical.

According to some embodiments, the material occupies a part of or all the interior space of the container. Hereby, a maximum amount of material is utilized, thereby facilitating a higher exchange, i.e. release of humidity to the air in the channel.

According to some embodiments, the front wall of the additive hood is fenestrated. Hereby, the adding of moisture/humidity to the material and release of moisture/humidity from the material is improved enabling increased humidity of the air in the channel.

According to some embodiments, the front wall comprises at least one front hole for humidification of the material. Hereby, the adding of moisture/humidity to the material is improved and/or increased humidity of the air in the channel is provided.

According to some embodiments, the front wall comprises at least two front holes, the front holes preferably being located equidistantly from each other and the front holes preferably being located closer to an edge of the front wall than to a center of the front wall. Hereby, the adding of moisture/humidity to the material is enabled.

According to some embodiments, at least one front hole allows exterior air to flow through the at least one front hole to the material, and the material allows the exterior air to flow through and/or over the material to the channel. Hereby, the humidity of air flowing through the channel is increased/improved.

According to some embodiments, the material is configured to humidify air flowing through the channel by adding a liquid, such as water, to the material. Hereby, the humidity of air flowing through the channel is increased/improved.

According to some embodiments, the liquid is added to the material through a front hole. Hereby, the humidity of air flowing through the channel is increased/improved and/or the adding of a liquid is facilitated.

According to some embodiments, the additive hood is configured to be attached to the tracheostomy valve, preferably by a snap on mechanism, the snap on mechanism comprising an extension of the sidewall configured to be detachably attached to the tracheostomy valve. Hereby, the additive hood can easily be attached and/or detached from a tracheostomy valve.

According to some embodiments, the additive hood is configured to be detached for adding the liquid after being utilized for a certain period of time. Hereby, the long term maintaining of a suitable level of humidity is facilitated.

According to some embodiments, the additive hood further comprises a side channel, extending between the front wall and the material and between the rear wall and the material, allowing exterior air to flow through the container to the tracheostomy valve during inhalation. Hereby, the humidification of the air flowing into the tracheostomy valve is improved According to some embodiments, the material of the additive hood has a first end facing the front wall and second end facing the rear wall, which first end is located at a distance from the front wall. This improves the distribution of and "even out" incoming air over a larger area/surface of the material increasing the path of airflow and thereby the release of moisture from the material and the additional absorbing of moisture by the incoming air.

According to some embodiments, the additive hood is an external and/or outer detachable cover of the inlet of a tracheostomy valve. This gives easy access to the hood, e.g. when adding liquid to the hood without having to detach it from the valve.

According to some embodiments, a tracheostomy valve comprises a detachable additive hood and/or insert and/or cap and/or lid according to any of the disclosed embodiments for humidifying air entering into the tracheostomy valve. This enables further humidification of air and better control of the humidification of the air entering a one-way tracheostomy valve, e.g. a speaking tracheostomy valve, and/or a two-way tracheostomy valve, e.g. a humidifying tracheostomy valve, in a first humidifying step or stage to further lessen the drying out of delicate mucous membranes when inhaling.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure will be more fully appreciated by reference to the following illustrative and non-limiting detailed description of example embodiments of the present disclosure, when taken in conjunction with the accompanying drawings.

FIG. 10 shows a cross sectional side view of an additive hood for humidifying air and being configured to be detachably attached to a tracheostomy valve, according to an embodiment of the present disclosure.

FIG. 11 shows a cross sectional side view of an additive hood for humidifying air and being configured to be detachably attached to a tracheostomy valve according to an embodiment of the present disclosure.

DETAILED DESCRIPTION

The present disclosure will now be described with reference to accompanying drawings 1A to 14, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The term "humidify" is to be interpreted as increasing the humidity or moisture of the air, i.e. the moisture content thereof.

The present disclosure relates to a detachable additive hood and/or lid and/or cap and/or insert and/or top and/or cover for humidifying air entering into a breathing/tracheostomy valve. The detachable additive hood and/or lid and/or cap and/or insert is especially useful for speaking tracheostomy valves, since for this kind of valves there is no exhaled air available, which can be utilized for capturing moisture prior to its release to the atmosphere, e.g. by the utilization of some kind of moisture-heat exchanger. The present disclosure relates to a detachable additive hood and/or lid and/or cap and/or insert and/or top and/or cover of a tracheostomy valve for additional, i.e. extra humidification of air entering into a humidifying tracheostomy valve. The detachable additive hood and/or lid and/or cap and/or insert and/or top and/or cover is also useful for humidifying tracheostomy valves, since for this kind of valves there is exhaled air available, which can be utilized for capturing moisture prior to its release to the atmosphere, e.g. by the utilization of some kind of air-permeable moisture-heat exchanger, but in many cases this inherent or built-in air-permeable moisture-heat exchanger of these humidifying tracheostomy valves is not able to provide the entering air with enough humidity, wherefore this detachable additive hood and/or lid and/or cap and/or insert and/or top and/or cover provides an additional stage or step of further/additional humidification of the air entering humidifying tracheostomy valves before reaching the inherent or built-in air-permeable moisture-heat exchanger.

Figure 1A:
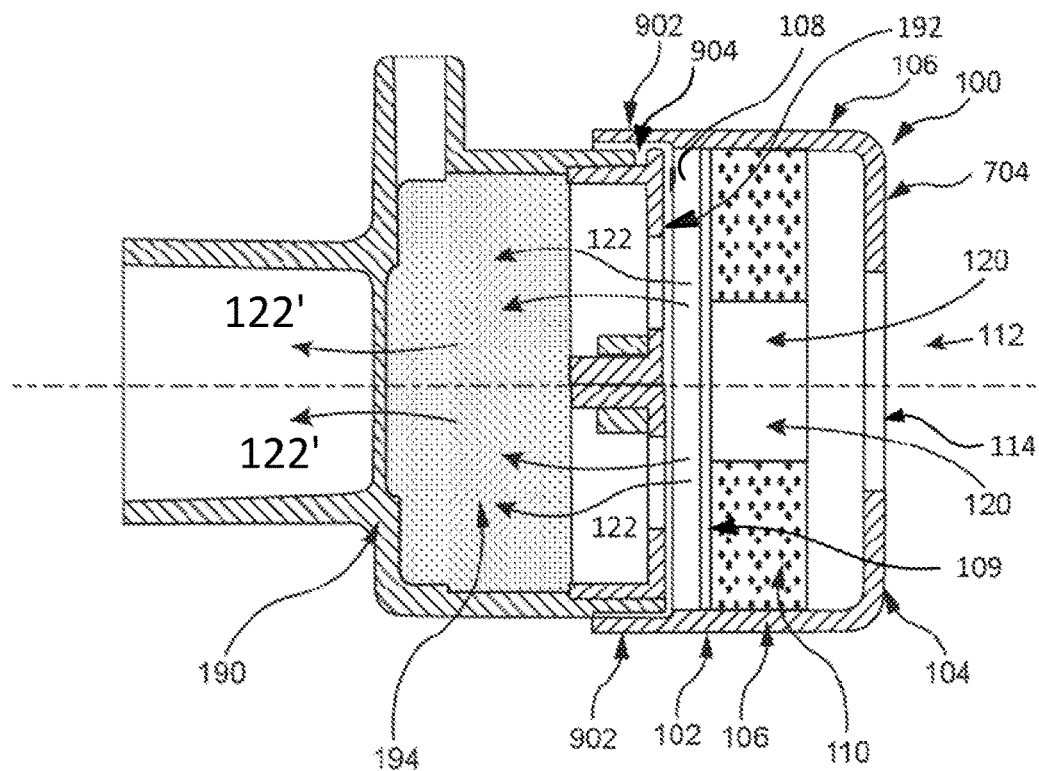
FIG. 1A shows a cross sectional side view of an additive hood for humidifying air, detachably attached to a tracheostomy valve, according to an embodiment of the present disclosure.
Figure 1B:
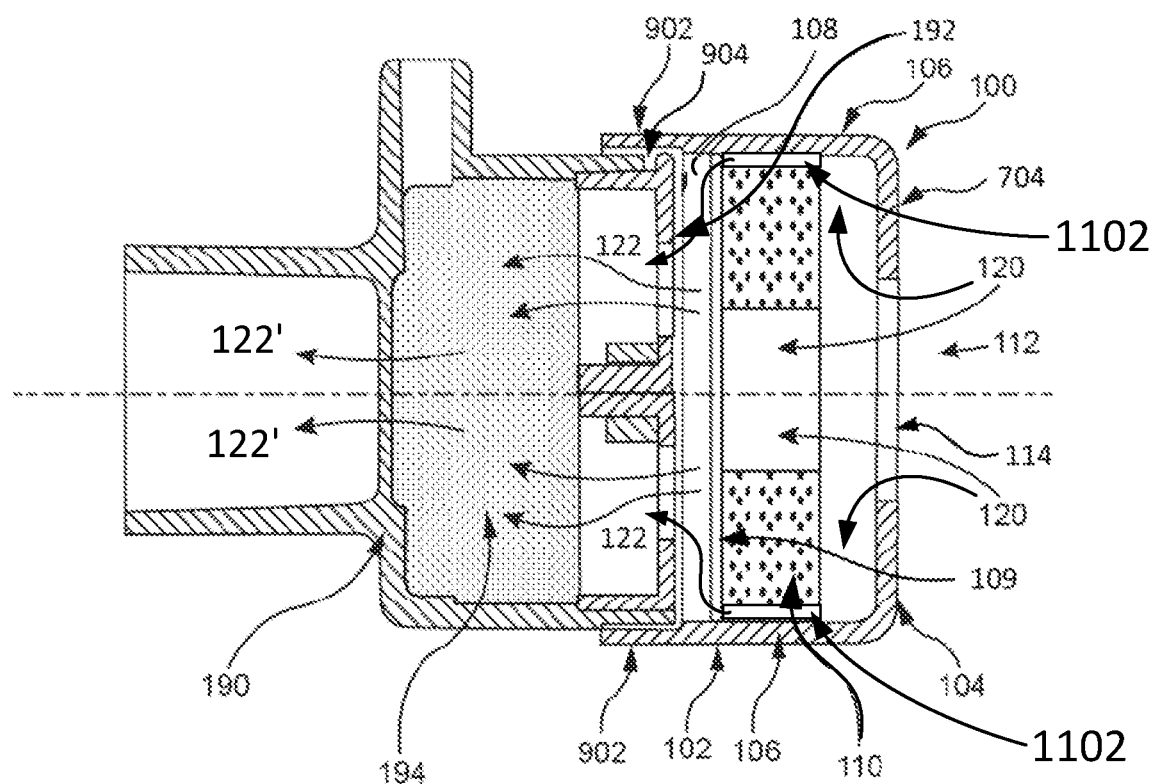
FIG. 1B shows a cross sectional side view of an additive hood for humidifying air, detachably attached to a tracheostomy valve, according to an embodiment of the present disclosure.

FIGS. 1A and 1B show a cross sectional side view of an additive hood and/or a lid and/or cap and/or insert and/or inset and/or top and/or cover 100 for humidifying air 120. The additive hood 100 is attached to a tracheostomy valve 190 having a filter 194. The filter 194 may in some embodiments occupy a large portion, such as more than half, of the space inside the tracheostomy valve 190. Alternatively, the filter 194 may in some embodiments occupy only a small portion, such as less than 50 percent, less than 25 percent or less than 10 percent, of the space inside the tracheostomy valve 190. The trachestomy valve 190 may in some embodiments be provided with a membrane (see FIG. 10). The air 120 comes from the exterior of a tracheostomy valve 190 and/or the exterior of the additive hood 100. The air 120 enters into the tracheostomy valve 190 via the additive hood 100. The additive hood 100 humidifies the air 120. Thus, the additive hood 100 is a humidifying cover for the tracheostomy valve 190. The additive hood 100 comprises a container 102. The container 102 comprises a front wall 104 and a rear wall 108 and may have any suitable shape. The rear wall 108 is configured to face an inlet 192 of the tracheostomy valve 190. In some embodiments, the rear wall 108 is shaped and sized to face and/or fit together with the inlet 192. Furthermore, the container 102 comprises a material 110. The material 110 is enclosed by the front wall 104 and the rear wall 108. In some embodiments, there is a further rear wall 109 and the material 110 is enclosed by the front wall 104 and the further rear wall 109. The material 110 is arranged inside the container 102. The material 110 is covered or surrounded by the container 102.

Moreover, the container 102 comprises one or more tunnels, canals or channels 112. The channel(s) 112 extends through the front wall 104. The front wall 104 may be fenestrated. The front wall 104 may be provided with one or more through-holes 114 to accommodate the channel(s) 112. Furthermore, the channel(s) 112 extends pass the material 110. The material 110 is located in proximity to the channel(s) 112. In some embodiments, there is no material 110 in the channel(s) 112. In some embodiments, the material 110 occupies a portion of the space surrounding the channel(s) 112. In some embodiments, the portion comprises or is a portion closest to the front wall 104 of the space in-between the front wall 104 and the rear wall 108. In some embodiments, the portion comprises or is a portion closest to the rear wall 108 of the space in-between the front wall 104 and the rear wall 108. In some embodiments, the portion comprises or is a portion at or around the midpoint between the front wall 104 and the rear wall 108. In some embodiments, the portion comprises a portion of the circumference surrounding the channel(s) 112. In some embodiments, the material 110 surrounds and confines the channel(s) 112 partly or completely in the space between the front wall 104 and the rear wall 108. In some embodiments, the material 110 occupies the whole space inside the container 102. Thus, the material 110 occupies all the interior space of the container 102 (except for the channel(s) 112, 1102). Moreover, the channel(s) 112 extend(s) through the rear wall 108. The rear wall 108 may be provided with a through-hole 116 (shown in FIG. 3) to accommodate the channel(s) 112. In some embodiments, the through-hole 116 is of the same shape and size as the through-hole 114.

The channel(s) 112, 1102 allows exterior air 120 to flow through the container 102 to the tracheostomy valve 190 during inhalation. The material 110 is configurable or configured to humidify air 120 flowing through the channel(s) 112, 1102.

In some embodiments, the container 102 comprises a sidewall 106 and the material 110 is enclosed by the front wall 104, the sidewall 106 and the rear wall 108. In some embodiments, the container 102 is cylindrical. In some embodiments, the container 102 is non-cylindrical, such as round, rounded, spherical or cubical. In some embodiments, the material 110 is in contact with the sidewall 106, see FIGS. 1A and 4A. In some embodiments, the material 110 is not in contact with the sidewall 106, see FIGS. 1B and 4B. Is some embodiments, there is one or more side channels 1102 provided between the material 110 and the side wall 106. In some embodiments, as shown in FIGS. 2C and 2D, the side channel 1102 extends around the circumference of the material 110. In FIG. 2E, the side channel 1102 is a through-hole located at a distance from the outer periphery of the material 110. In FIG. 2E, the side channel 1102 is a cavity forming a through-hole between the outer periphery of the material 110 and the side wall 106. The side channel(s) 1102 is/are configured to let air 120 through.

In some embodiments, any one or more of the front wall 104, the sidewall 106 and the rear wall 108 comprises a hard material, such as plastic, rubber or metal. Thus, the moisture/humidity is kept inside the additive hood 100 and only directed towards and/or delivered to the channel(s) 112.

In some embodiments, the material 110 comprises a liquid and/or moisture carrying material, a foamy material, a fibrous material, a cellulose and/or a porous material. The liquid and/or moisture carrying material may be a foamy material, a fibrous material, a porous material or any combination thereof.

In some embodiments, the channel(s) 112 is/are located around or starts at the center 502 (see FIGS. 2A and 2B) of the front wall 104. Additionally or alternatively, the channel(s) 112 is/are located around or ends at the center 504 (see FIGS. 3, 2C and 2D) of the rear wall 108. In some embodiments, the channel(s) 112 is/are cylindrical. Alternatively, the channel(s) 112 is/are spherical, cubical or cuboidal.

In some embodiments, the additive hood 100 is configured to be detachably attached to the tracheostomy valve 190. Such attachment may be by a snap on mechanism. The snap on mechanism comprises an extension 902 of the sidewall 106 of the additive hood 100. The extension 902 is configured to be detachably attached to the tracheostomy valve 190. In some embodiments, the extension 902 surrounds the exterior of the tracheostomy valve 190 when attached and is sufficiently tight around the tracheostomy valve 190 so that a force from the extension 902 towards the tracheostomy valve 190 holds the additive hood 100 in place. Alternatively or additionally, the interior surface of the extension 902 is provided with at least one projection 904, which lock into at least one corresponding groove provided at the exterior of the tracheostomy valve 190. Alternatively or additionally, the exterior of the tracheostomy valve 190 is provided with at least one projection, which locks into a corresponding groove provided at the interior surface of the extension 902.

Figure 2A:
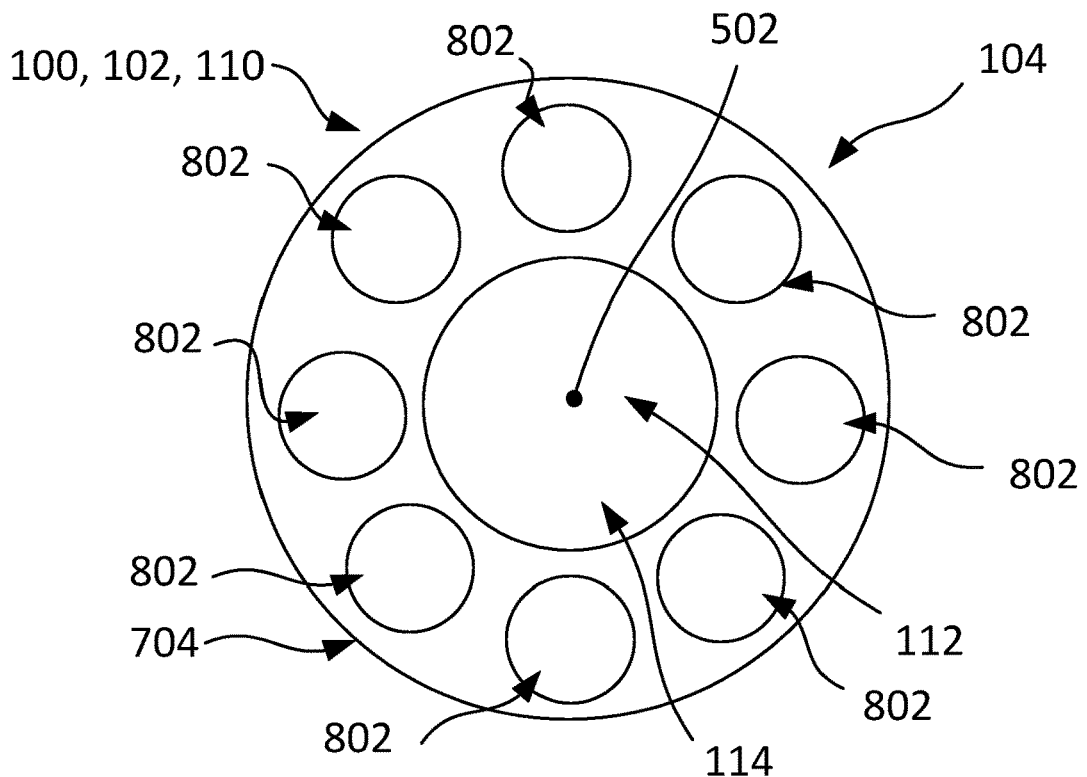
FIG. 2A shows a front view of an additive hood for humidifying air and being configured to be detachably attached to a tracheostomy valve according to an embodiment of the present disclosure.
Figure 2B:
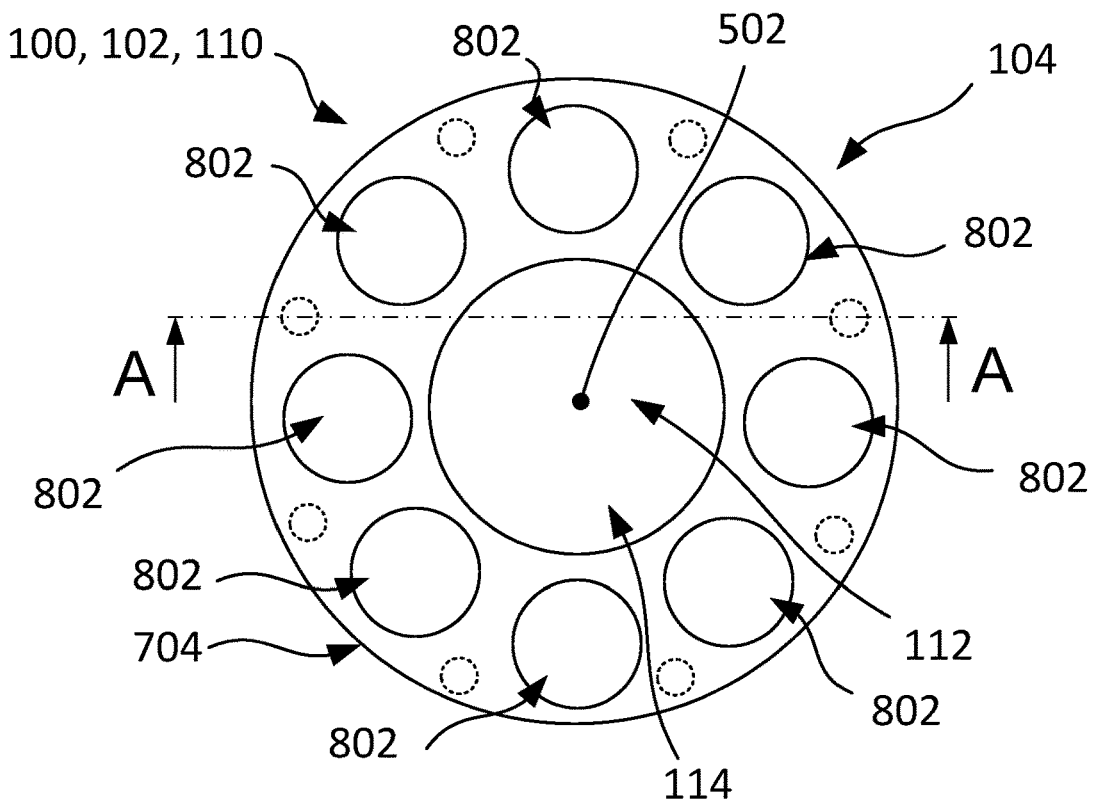
FIG. 2B shows a front view of an additive hood for humidifying air and being configured to be detachably attached to a tracheostomy valve according to an embodiment of the present disclosure.
Figure 2C:
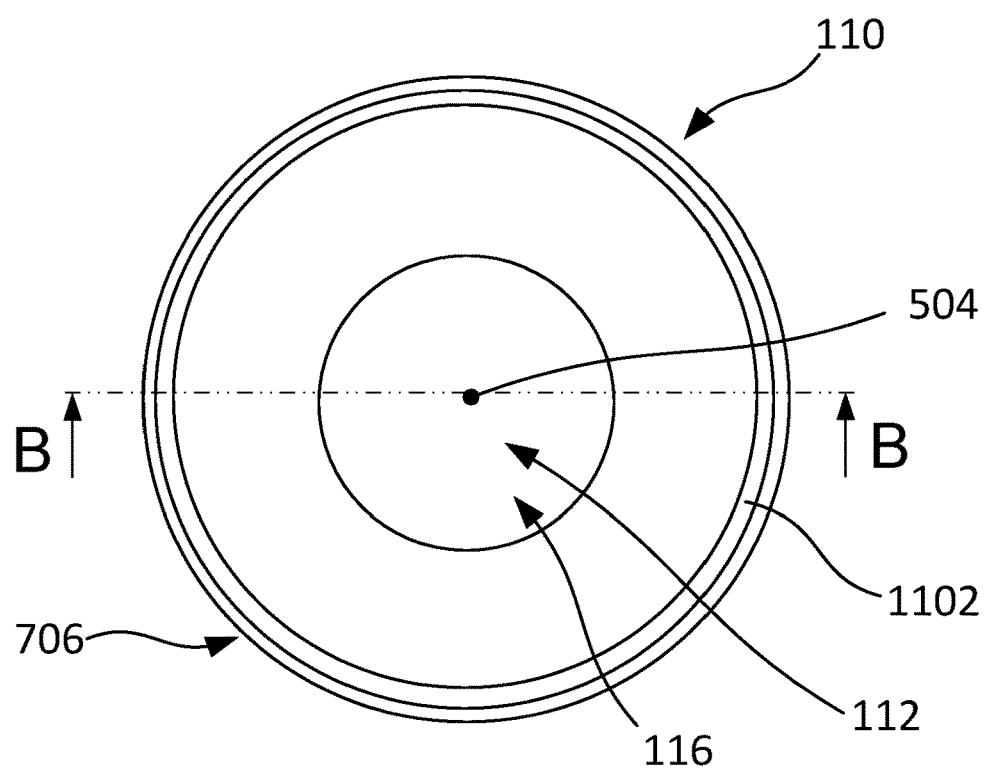
FIG. 2C shows a front view of a material in an additive hood for humidifying air without the lid and/or cap and/or insert and/or top and/or cover and/or hood according to an embodiment of the present disclosure.
Figure 2D:
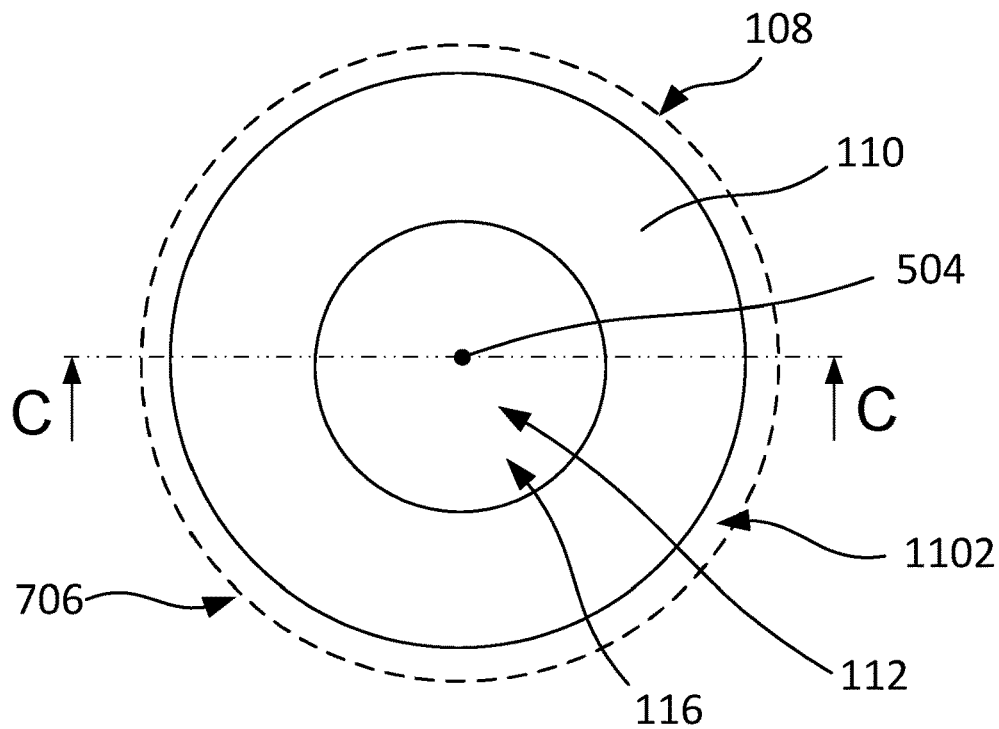
FIG. 2D shows a front view of a material in an additive hood for humidifying air without the lid and/or cap and/or insert and/or top and/or cover and/or hood according to an embodiment of the present disclosure.
Figure 2E:
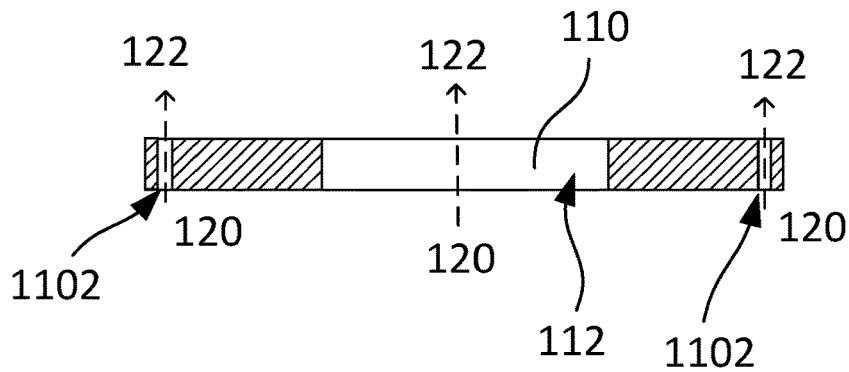
FIG. 2E shows a cross sectional view of the material in an additive hood along line A-A of FIG. 2B and/or along line B-B of FIG. 2C for humidifying air and being configured to be detachably attached to a tracheostomy valve, according to an embodiment of the present disclosure.
Figure 5:
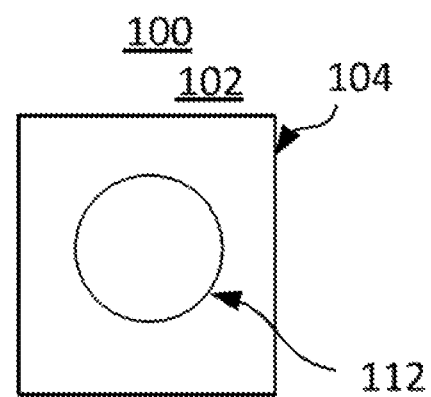
FIG. 5 shows a front view of an additive hood for humidifying air and being configured to be detachably attached to a tracheostomy valve according to an embodiment of the present disclosure.

FIGS. 2A and 2B show a front view of an additive hood 100 for humidifying air. Thus, FIGS. 2A and 2B show the front wall 104 of the container 102. The front wall 104 is in FIGS. 2A and 2B round and/or of circular shape. As shown in FIG. 5, the front wall 104 may be of any other suitable shape, such as circular, square, rectangular or forming a polygon, such as a monogon, a digon, a triangle, a tetragon, a pentagon, a hexagon, a heptagon, an octagon, a nonagon or a decagon.

The front wall 104 has a center 502 and comprises one or more through-holes 114 for accommodating or being an entrance to the channel(s) 112. In some embodiments, the through-hole 114 is round or circularly shaped. However, as shown in FIGS. 5-9, the through-hole 114 may be of any other suitable shape, such as circular, square, rectangular or forming a polygon, such as a monogon, a digon, a triangle, a tetragon, a pentagon, a hexagon, a heptagon, an octagon, a nonagon or a decagon. In some embodiments, the through-hole 114 is located around the center 502, and preferably located symmetrically around the center 502. However, the through-hole 114 may be located at other locations, such as close to an edge 704 of the front wall 104.

In some embodiments, the front wall 104 comprises at least one front hole 802. In some embodiments, the front hole 802 is a through-hole. Each of the front holes 802 depicted in FIGS. 2A and 2B is circular and has a diameter, which is smaller than a diameter of the circular through-hole 114. In FIG. 2B, the small holes visualizing smaller front holes 802 shown in dotted lines are in some embodiments optional, i.e. non-existing, and/or, in some embodiments, instead part of or through holes of the material 110 inside the container 102 and under the front wall 104 of the insert 100 as shown in FIGS. 2A and 2B. The at least one front hole 802 is, in some embodiments, utilized for humidification of the material 110. Humidification of the material 110 is performed in order for the material 110 to humidify air flowing through the channel 112. Thus, by further humidifying the material 110, the material 110 will be configured to humidify air flowing through the channel 112. Humidifying of the material 110 is, in some embodiments, performed by adding a liquid, such as water or saline water, i.e. water with dissolved salt(s), the salt(s) preferably being sodium chloride, to the material 110. The liquid is in some embodiments distilled water or distilled water with dissolved salt(s). In some embodiments, the liquid is added to the material through one or more of the front holes 802. The adding of liquid is, in some embodiments, performed while the additive hood 100 is attached to the tracheostomy valve 190. Alternatively or additionally, the additive hood 100 is configured to be detached from the tracheostomy valve 190 for adding the liquid. Such detachment is, in some embodiments, performed on a regular basis and/or at detected need, such as when the material 110 contains too little moisture and/or liquid, in order to increase the humidity of the material 110 by adding a liquid. Adding of a liquid is, in some embodiments, performed after the additive hood 100 has been utilized for humidifying air flowing through the channel fora certain time period, such as 1 hour, h, or 2 h, 3 h, 4 h, 6 h, 8 h, 12 h, 24 h, 2 days or 4 days. Adding of a liquid is, in some embodiments, performed after the additive hood 100 has been utilized for humidifying air flowing through the channel for a certain time period and the material 110 has been dried out to a certain degree, such as below a threshold of minimum content of moist and/or liquid. Adding of a liquid, in some embodiments, to the additive hood 100 and the material 110 is done until the material 110 is saturated. The amount of liquid added each time is between 1 and 4 milliliters, ml, and preferably 2 ml. As seen in FIGS. 2A and 2B, the front wall 104 comprises, in some embodiments, at least two front holes 802. The front holes 802 are, preferably, located equidistantly from each other. Furthermore, the front holes 802 are, preferably, located closer to the edge 704 of the front wall 104 than to the center 502 of the front wall 104. In some embodiments, the front holes 802 are round or circularly shaped. However, as shown in FIGS. 5-9, the front holes 802 may be of any other suitable shape, such as circular, square, rectangular or forming a polygon, such as a monogon, a digon, a triangle, a tetragon, a pentagon, a hexagon, a heptagon, an octagon, a nonagon or a decagon. Furthermore, as seen in FIG. 9, the front holes 802 may be of different shapes and/or different sizes.

The material 110 is shown in front views 2C and 2D in a corresponding plane shown in views 2A, 2B, 5 to 9, and 14, Here, the material 110, in some embodiments, could be provided with through holes forming channels. These through holes are in some embodiments similar to side channels 1102 and the front holes 802 and through hole(s) 116. In some embodiments, these through holes may be arranged with corresponding layout(s) and at substantially the same or the same positions and/or be substantially aligned or exactly aligned with the front holes 802. This enables air 120 to pass/flow through the through channels 112, 1102, 116 and front holes easier and in a way making it possible to adapt the airflow path and/or surface and/or area of the material 110 being "overflown" by the air 120, such that the humidifying of the air 120 into the more humid air 122, 122' is better controlled by means of the additive hood 100. In FIGS. 1A, 1B, 4A and 4B, the air 120 is in some embodiments humidified in two steps, a first step via the additive hood 100 and its material 110 into more humid air 122, and then in a second step further humidified via the filter 194 into even more humid air 122' during inhalation. In some embodiments, the filter 194 takes up moisture/humidity when exhaling and releases that moisture/humidity to incoming air 122 when flowing in at inhaling. In some embodiments, the air 120 is optionally humidified in only one or a first step via the additive hood 100 being detachable from the tracheostomy valve 190. In FIGS. 1A, 1B, 4A, 4B, 10, 11 and 12, i.e. in some embodiments, the front wall 104 is located at a distance from the material 110 enabling air 120 to flow over a large area of the material facing the front wall 104. In FIGS. 1B, 4B, 10 and 11, i.e. in some embodiments, the air 120 flows via side channels 1102 and the center channel 112 through and/or past/over the material 110. In FIGS. 1B, 4B, 10 and 11, i.e. in some embodiments, the air 120 flows over a larger area and/or volume and/or surface of the material 110 via side channels 1102 and the center channel 112 through and/or past/over the material 110 compared to the embodiments of FIGS. 1A and 4A where most of or all of the air 120 flows through the center channel 112.

Figure 3:
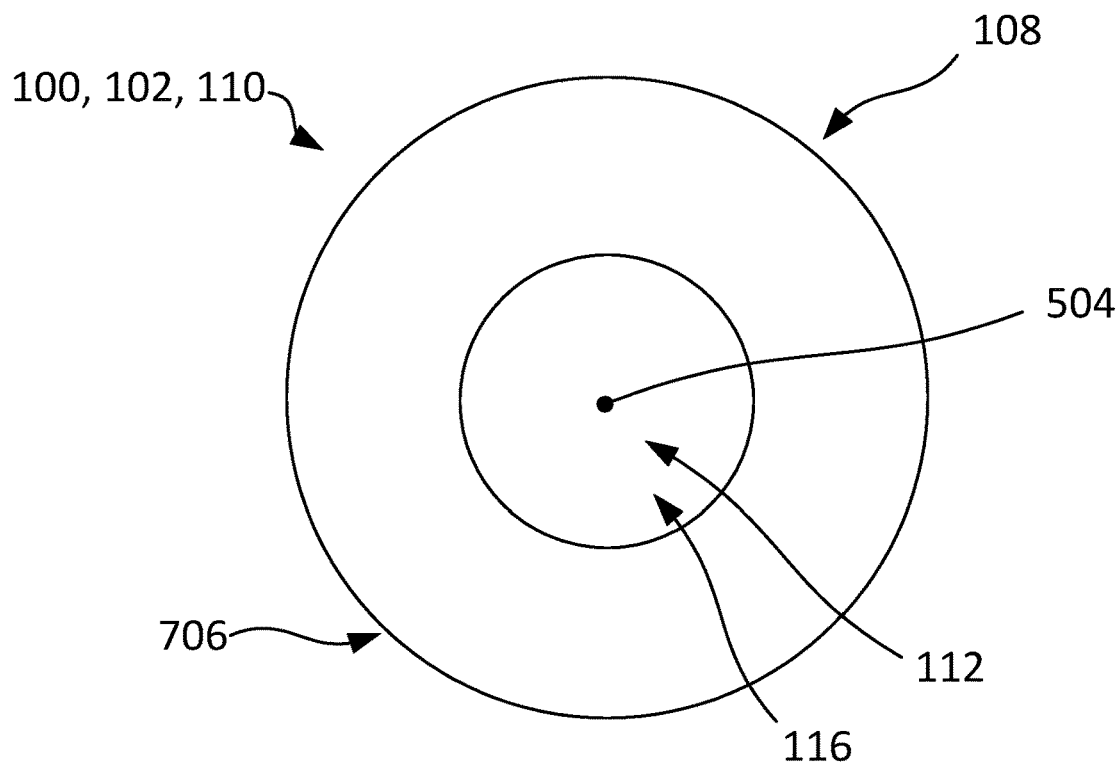
FIG. 3 shows a rear view of an additive hood for humidifying air and being configured to be detachably attached to a tracheostomy valve according to an embodiment of the present disclosure.
Figure 6:
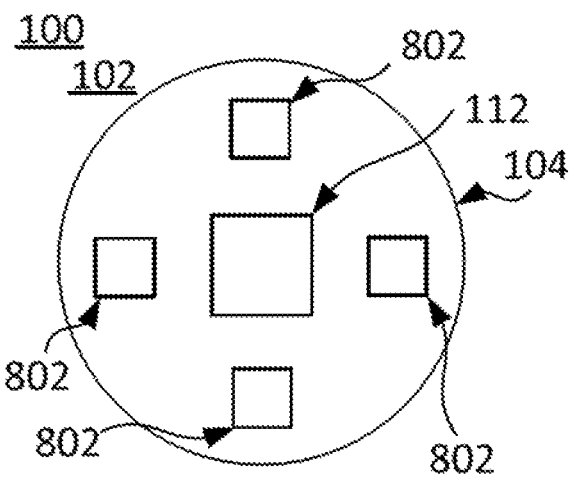
FIG. 6 shows a front view of an additive hood for humidifying air and being configured to be detachably attached to a tracheostomy valve according to an embodiment of the present disclosure.
Figure 7:
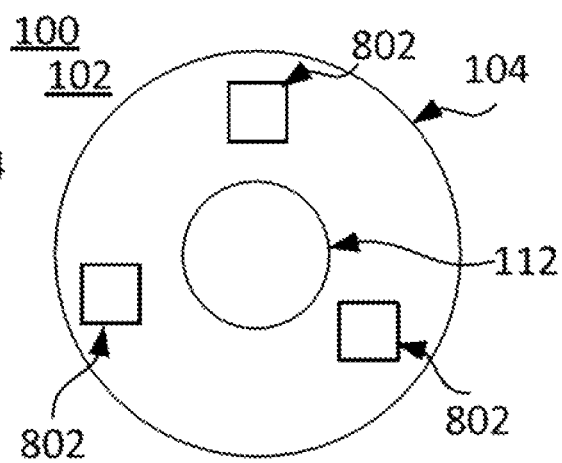
FIG. 7 shows a front view of an additive hood for humidifying air and being configured to be detachably attached to a tracheostomy valve according to an embodiment of the present disclosure.

In FIGS. 2A, 2B and 3, i.e. in some embodiments, the additive hood 100 and its container 102 are shown comprising the material 110. In FIGS. 5 to 9, in some embodiments, only the additive hood 100 and its container 102 are seen, i.e. the material 110 is not shown, however, as the additive hood 100 and its container 102 comprises the material 110 for use, also FIGS. 5 to 9 could in other embodiments reveal the material 110 through the openings of the front wall 104. In some embodiments, the material 110 is provided with the same or similar hole layout as the front wall 104 of the additive hood 100 or any combination of hole layouts, such as the ones of FIGS. 6 and 7 provided with more than three or four or five or six through holes 112, 1102, 116 and/or with any similar or the same shape as any of the front holes 802 of FIGS. 2A to 2D, 3, 4A, 4B, and 5 to 9 or any combination of layout and/or number and/or shape of through holes, the same goes for the front wall 104 itself, as long as the incoming air 120 is sufficiently humidified.

FIG. 3 shows a rear view of an additive hood 100 for additionally humidifying air. Thus, FIG. 3 shows the rear wall 108 of the container 102. The rear wall 108 is in FIG. 3 round and/or of circular shape. The rear wall 108 may be of any other suitable shape, e.g. suitable for fitting together with a tracheostomy valve 190, such as circular, square, rectangular or forming a polygon, such as a monogon, a digon, a triangle, a tetragon, a pentagon, a hexagon, a heptagon, an octagon, a nonagon or a decagon. Furthermore, the rear wall 108 is, in some embodiments, sized and/or shaped to fit together with the tracheostomy valve 190, e.g. having same or similar diameter. In some embodiments, the rear wall 108 has a center 504 and comprises a through-hole 116 for accommodating or being an entrance/exit for a channel 112. In some embodiments, the through-hole 116 is round or circularly shaped. However, the through-hole 116 may be of any other suitable shape, such as the shapes described above for the through-hole 114 and/or shaped as shown in FIGS. 5-9. The through-hole 116 is located around the center 504, and preferably located symmetrically around the center 504. However, the through-hole 116 may be located at other locations, such as close to an edge 706 of the rear wall 108. In some embodiments, the through-hole 116 is located at a position of the rear wall 108 corresponding partly or fully with a position of an inlet 192 of a tracheostomy valve 190, e.g. when the additive hood 100 is attached to the tracheostomy valve 190.

Figure 4A:
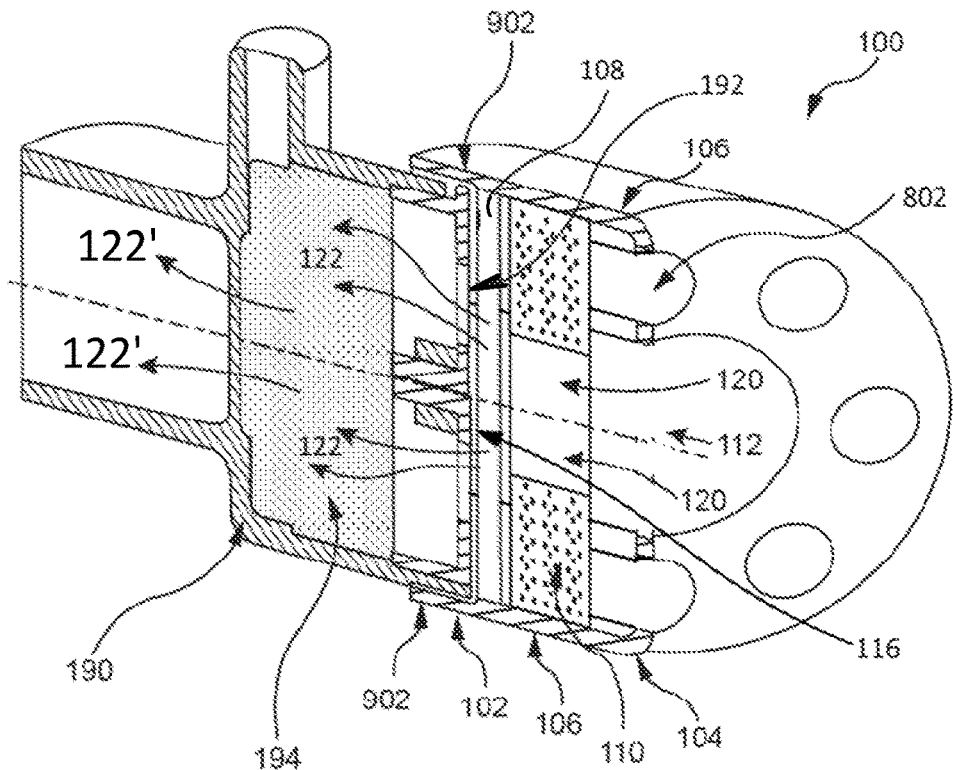
FIG. 4A shows a three-dimensional cross sectional view of an additive hood for humidifying air, detachably attached to a tracheostomy valve, according to an embodiment of the present disclosure.
Figure 4B:
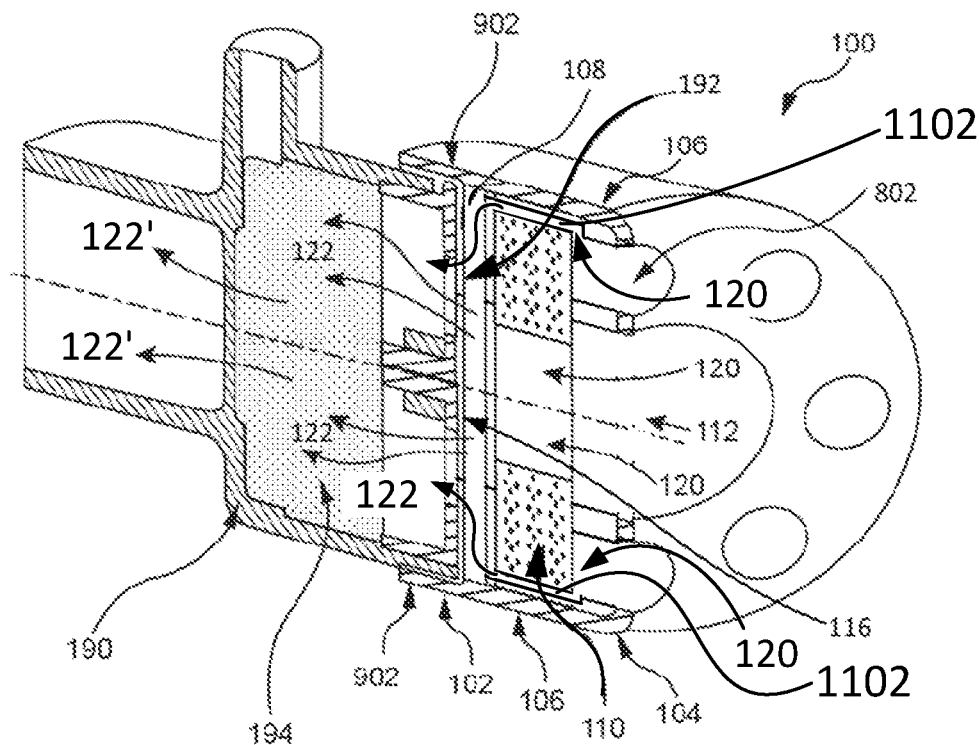
FIG. 4B shows a three-dimensional cross sectional view of an additive hood for humidifying air, detachably attached to a tracheostomy valve, according to an embodiment of the present disclosure.

FIGS. 4A and 4B show a three-dimensional cross sectional view of an additive hood 100 for humidifying air 120, attached to a tracheostomy valve 190. The different parts of the additive hood 100 have been described in connection with FIGS. 1A and 1B. In some embodiments, the channel 112 is defined by the space confined and surrounded by the material 110 in-between the front wall 104 and the rear wall 108. The channel 112 allows air 120, exterior to the additive hood 100, to flow through the container 102 to the tracheostomy valve 190 during inhalation. Air 120 enters the channel 112 through the through-hole 114 of the front wall 104 and passes by the material 110. While the air 120 passes by the material 110, the air 120, having a humidity lower than the humidity of the material 110, is humidified by the material 110. In some embodiments, the additive hood 100 humidifies the incoming air 120 in a first step or stage into more humid air 122. In some embodiments, the moisture/humidity exchange/transfer from the material 110 to the air 120 is through convection. After passing by the material 110, the humidified air 122 exits the channel 112 through the through-hole 116 of the rear wall 108. Subsequently, the humidified air 122 enters the tracheostomy valve 190. In some embodiments, the incoming air 122 is humidified in a further step into even further humidified air 122'. In some embodiments, the front wall 104 of the container 102 comprises at least one front hole 802. In some embodiments, exterior air 120 is allowed to flow not just through the channel 112 but also through the at least one front hole 802 to the material 110. Once the air 120 has entered into the material 110 and/or the channel(s) 112, the air 120 is humidified by the material as the material 110 has a higher humidity than the air. In some embodiments, the material 110 allows the exterior air 120 to flow through the material 110 and into the channel 112. Thereby, the humidity of the air flowing through the channel 112 is further increased before entering the inlet 192 of the tracheostomy valve 190.

FIG. 5 shows a front view of an additive hood 100 for humidifying air. The additive hood 100 comprises a container 102. The container 102 comprises a front wall 104. The front wall 104 is square or rectangular and comprises a through-hole 112. The through-hole 112 is circular.

FIG. 6 shows a front view of an additive hood 100 for humidifying air. The additive hood 100 comprises a container 102. The container 102 comprises a front wall 104. The front wall 104 is circular and comprises a through-hole 112. The through-hole 112 is square or rectangular. Furthermore, the front wall 104 comprises four front holes 802. The front holes 802 are square.

FIG. 7 shows a front view of an additive hood 100 for humidifying air. The additive hood 100 comprises a container 102. The container 102 comprises a front wall 104. The front wall 104 is circular and comprises a through-hole 112. The through-hole 112 is circular. Furthermore, the front wall 104 comprises three front holes 802. The front holes 802 are square.

Figure 8:
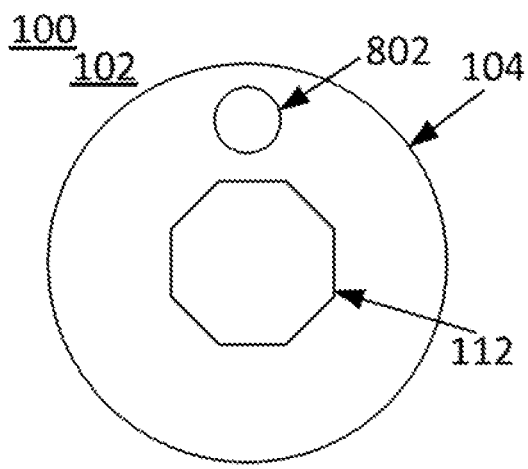
FIG. 8 shows a front view of an additive hood for humidifying air and being configured to be detachably attached to a tracheostomy valve according to an embodiment of the present disclosure.
Figure 9:
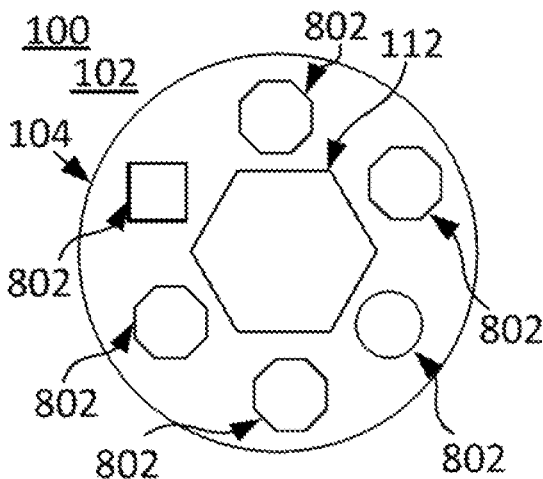
FIG. 9 shows a front view of an additive hood for humidifying air and being configured to be detachably attached to a tracheostomy valve according to an embodiment of the present disclosure.

FIG. 8 shows a front view of an additive hood 100 for humidifying air. The additive hood 100 comprises a container 102. The container 102 comprises a front wall 104. The front wall 104 is circular and comprises a through-hole 112. The through-hole 112 is shaped as an octagon. Furthermore, the front wall 104 comprises one front hole 802. The front hole 802 is circular.

FIG. 9 shows a front view of an additive hood 100 for humidifying air. The additive hood 100 comprises a container 102. The container 102 comprises a front wall 104. The front wall 104 is circular and comprises a through-hole 112. The through-hole 112 is shaped as a hexagon. Furthermore, the front wall 104 comprises six front holes 802. One of the front holes 802 is square. One of the front holes 802 is circular. Four of the front holes 802 are shaped as hexagons.

FIG. 10 shows a cross sectional side view of an additive hood 100 for humidifying air. The additive hood 100 is attached to a tracheostomy valve 190. The tracheostomy valve 190 comprises a membrane 196 and a membrane holder 198. The membrane 196 is held in place by the membrane holder 198. As the membrane 196 and the membrane holder 198 blocks part of the interior of the tracheostomy valve 190, the humidified air 122 coming from the additive hood 100 is forced to go around the membrane 196 and the membrane holder 198 when inhaling as the membrane 196 is bent and opens the air flow path as shown. When exhaling the membrane 196 closes the airflow path by closing the inlet 192 (not shown).

Figure 2F:
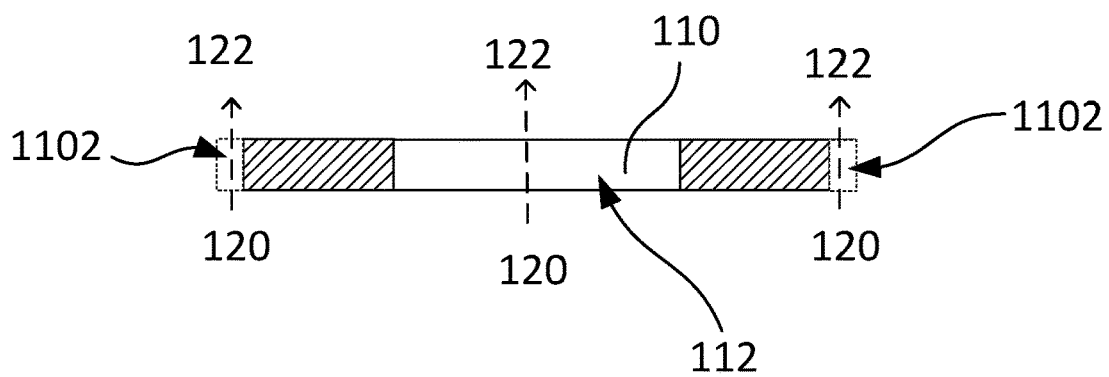
FIG. 2F shows a cross sectional view of the material being part of an additive hood along line C-C of FIG. 2D for humidifying air and being configured to be detachably attached to a tracheostomy valve, according to an embodiment of the present disclosure.

FIG. 11 shows a cross sectional side view of an additive hood 100 for humidifying air 120. The figure shows a side channel 1102 for carrying the inhaled air 120 around the material 110. The side channel 1102 extends between the front wall 104 and the material 110, preferably between the sidewall 106 and the material 110, and between the rear wall 108 and the material 110, thereby carrying the inhaled air 120 all around the material 110 and exposing the inhaled air to the material 110 all along its path. The side channel 1102 is utilized in addition to the channel 112. The air in the side channel 1102 enters from the channel 112 or from a front hole 802. The air in the side channel 1102 exits to the channel 112 or directly into the tracheostomy valve 190. With the utilization of the side channel 1102, the humidification of the air 120 flowing into the tracheostomy valve 190 is further improved by the air 120 flowing over and around a larger surface of the material 110, thereby enabling absorbing more moist. In some embodiments, the additive hood 100 comprises a structure 1400 comprising beams or bars 1402 (shown in FIG. 14), extending, at the inside of the front wall 104, from an edge 704 of the front wall 104 towards the center 502 of the front wall 104 and/or at the inside of the rear wall 108, from an edge 706 of the rear wall 108 towards the center 504 of the rear wall 108 and/or at the inside of the sidewall 106, along the sidewall 106, thereby creating or defining gaps between the material 110 and the front wall 104 and/or between the material 110 and the rear wall 108 and/or between the material 110 and the sidewall 106. The side channel 1102 comprises these gaps or the gaps define the side channel 1102. The side channel(s) 1102 is/are also shown in FIGS. 1B, 2D, 2E, 2F and 4B. In FIG. 2E, each side channel 1102 is a through-hole through the material 110. In FIG. 2F, each gap between the material 110 and the sidewall 106 are visualized by dotted areas at each edge forming a void or the side channel(s) 1102. The outer boundary of the void or side channel(s) 1102 and where the rear wall 108 ends is visualized by the dotted circle in FIG. 2D. In some embodiments, e.g. in FIGS. 2C and 2D, the material 110 has a donut shape. In some embodiments, e.g. in FIGS. 2C and 2E, the material 110 comprises one inner part being donut-shaped having the channel 112 and an outer part having an annular shape configured to be located adjacent the sidewall 106, wherein the side channel 1102 is formed as a through slit extending along the inner circumference of the outer annular part and along the outer circumference of the inner donut-shaped part, i.e. between the outer annular part and the inner donut-shaped part.

In FIGS. 2E and 2F, the drier air 120 and additionally humidified air 122 and the direction of airflow are visualized by arrows in broken lines.

Figures 12, 13:
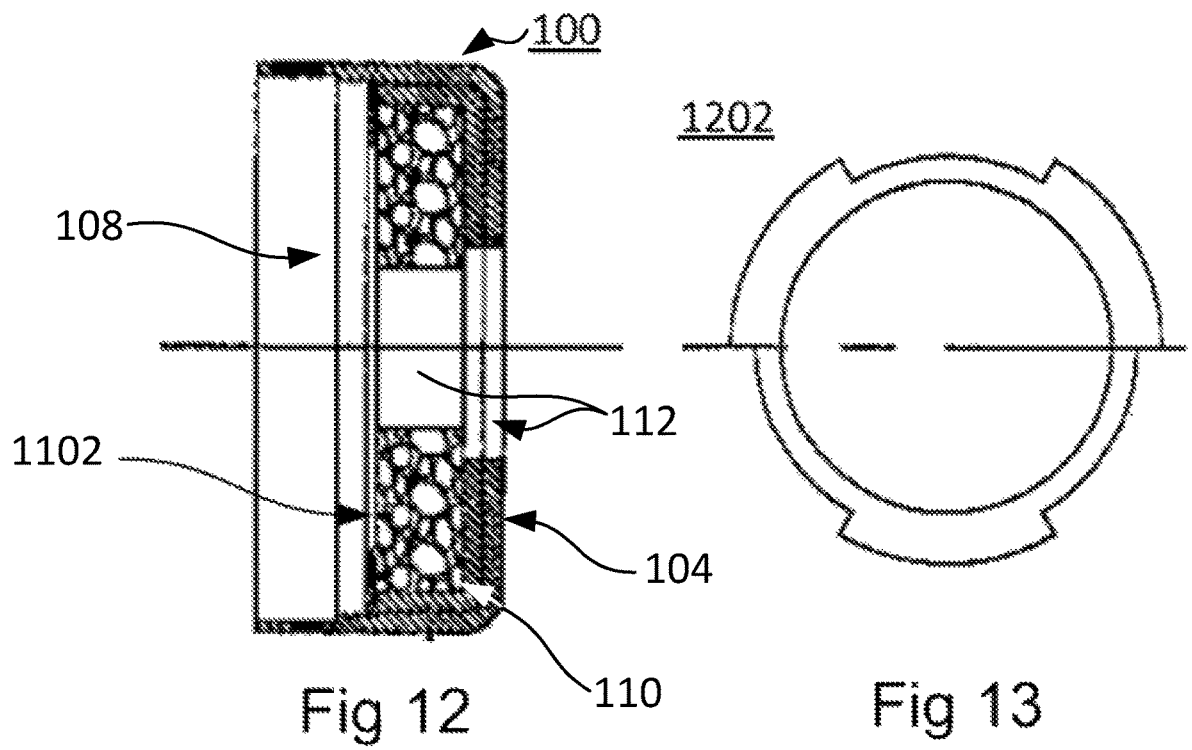
FIG. 12 shows a cross sectional side view of an additive hood for humidifying air and being configured to be detachably attached to a tracheostomy valve according to an embodiment of the present disclosure.
FIG. 13 shows a retaining ring for an additive hood for humidifying air and being configured to be detachably attached to a tracheostomy valve according to an embodiment of the present disclosure.

FIG. 12 shows a cross sectional side view of an additive hood 100 for humidifying air 120. The additive hood 100 is provided with a retaining ring 1202 for holding components, such as the material 110 (pointed at with an arrow having a white arrow-head), when installed. The retaining ring 1202 is, in some embodiments, configured to fit into one or more grooves of the rear wall 108.

FIG. 13 shows a front view of the retaining ring 1202.

Figure 14:
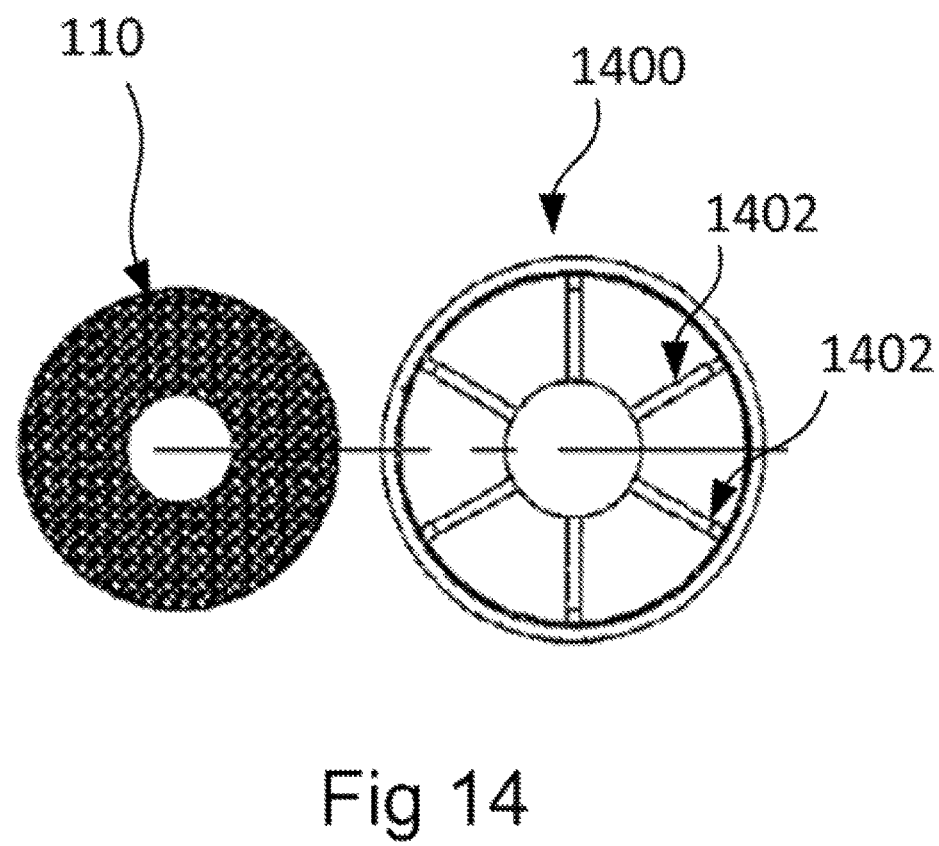
FIG. 14 shows a top view of a structure according to an embodiment of the present disclosure.

FIG. 14 shows a top view of a structure 1400 and the material 110. The structure 1400 comprises beams or bars 1402. The structure 1400 is put in-between the material 110 and the front wall 104 and/or in-between the material 110 and the rear wall 108. Thus, there will be a gap in-between the material 110 and the front wall 104 and/or in-between the material 110 and the rear wall 108. A similar structure may be put in-between the material 110 and the sidewall 106, thereby forming a gap in-between the material 110 and the sidewall 106. The gaps form part or all of a side channel 1102.

This extra humidifying additive hood 100 is usable for both one-way and two-way tracheostomy valves 190 to add extra or additional humidity to the air 120 entering a tracheostomy valve. In some embodiments, the filter 194 is only a filter and not a combined filter and moisture and/or heat exchanger, such as in one of possible embodiments of FIG. 10. In FIGS. 11 to 14, only the additive hood 100 and its parts are shown before being attached to a tracheostomy valve 190 or after being removed from a tracheostomy valve or after or before being refilled with liquid/humidity or before being assembled into the additive hood or after being disassembled.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

LIST OF REFERENCE NUMERALS

Additive hood 100
Container 102
Front wall 104
Sidewall 106
Rear wall 108
Material 110
Channel 112
Through-hole (of front wall) 114
Through-hole (of rear wall) 116
Air 120
Humidified air 122
Further/Additionally/Extra humidified air 122'
Tracheostomy valve 190
Inlet (of the tracheostomy valve) 192
Filter (of the tracheostomy valve) 194
Membrane (of the tracheostomy valve) 196
Membrane holder (of the tracheostomy valve) 198
Center 502 (of the front wall 104)
Center 504 (of the rear wall 108)
Front hole (802)
Edge 704 (of the front wall 104)
Edge 706 (of the rear wall 108)
Extension 902 (of the sidewall 106)
Projection 904 (of the extension)
Side channel 1102
Retaining ring 1202

The invention claimed is:

1. An additive hood for humidifying air entering into a tracheostomy valve, the additive hood being configured to be attached at an inlet of the tracheostomy valve and comprises:
　a container having
　　a front wall and
　　a rear wall, the rear wall being configured to face the inlet of the tracheostomy valve;
the container comprising:
　a material enclosed by the front wall, and the rear wall; wherein the material comprises
　at least a center through channel, extending through the front wall, extending past the material and extending through the rear wall, allowing exterior air to flow through the container to the tracheostomy valve during inhalation, wherein the material is configurable or configured to humidify air flowing through the channel, and the material has a first end facing the front wall and a second end facing the rear wall, which first end is located at a first distance from the front wall and/or the second end is located at a second distance from the rear wall enabling the air to flow through a first space between the front wall and the material and/or a second space between the rear wall and the material.

2. The additive hood of claim 1, wherein the container further comprises a sidewall and wherein the material is enclosed by the front wall, the sidewall and the rear wall and/or wherein the container is cylindrical.

3. The additive hood of claim 2, wherein the front wall, the sidewall and/or the rear wall comprises a hard material.

4. The additive hood of claim 2, configured to be attached to the tracheostomy valve by a snap on mechanism, the snap on mechanism comprising an extension of the sidewall configured to be detachably attached to the tracheostomy valve.

5. The additive hood of claim 1, wherein the channel is surrounded and/or confined by the material.

6. The additive hood of claim 1, wherein the material comprises a moisture carrying material, a foamy material, a fibrous material and/or a porous material.

7. The additive hood of claim 1, wherein the channel is located at a center of the front wall and/or at a center of the rear wall.

8. The additive hood of claim 1, wherein the channel is cylindrical.

9. The additive hood of claim 1, wherein the front wall is fenestrated.

10. The additive hood of claim 9, wherein the front wall comprises at least two front holes, the front holes being located equidistantly from each other and the front holes being located closer to an edge of the front wall than to a center of the front wall.

11. The additive hood of claim 9, wherein at least one front hole allows exterior air to flow through the at least one front hole to the material, and wherein the material allows the exterior air to flow through and/or over the material to the channel, thereby increasing the humidity of air flowing through the channel.

12. The additive hood of claim 1, wherein the front wall comprises at least one front hole for humidification of the material.

13. The additive hood of claim 1, wherein the material is configured to humidify air flowing through the channel) by adding a liquid to the material.

14. The additive hood of claim 13, wherein the additive hood comprises a front hole enabling the liquid to be added to the material through the front hole.

15. The additive hood of claim 14, wherein the additive hood is configured to be detached for adding the liquid after being utilized for a certain period of time.

16. The additive hood of claim 1, wherein the additive hood further comprises:
　a side channel, extending between the front wall and the material and between the rear wall and the material, allowing exterior air to flow through the container to the tracheostomy valve during inhalation.

17. A tracheostomy valve comprising the additive hood according to claim 1.

* * * * *